United States Patent [19]

Sato et al.

[11] Patent Number: 4,665,282
[45] Date of Patent: May 12, 1987

[54] TABLET TYPE COORDINATE INPUT APPARATUS USING ELASTIC WAVE

[75] Inventors: Ichiya Sato, Hitachi; Takao Yoneyama, Katsuta; Masanori Tanabe, Hitachi; Kanji Kawakami, Mito; Hisao Okada; Soji Sasaki, both of Hitachi; Shigeru Inose, Tochigi; Mareo Suto, Tochigi; Hideo Uzuhashi, Tochigi, all of Japan

[73] Assignee: Hitachi, Ltd., Tokyo, Japan

[21] Appl. No.: 758,463

[22] Filed: Jul. 24, 1985

[30] Foreign Application Priority Data

Jul. 25, 1984 [JP] Japan ................................. 59-153111
Jul. 25, 1984 [JP] Japan ................................. 59-153112
Jul. 25, 1984 [JP] Japan ................................. 59-153118
Oct. 19, 1984 [JP] Japan ................................. 59-220971
Jun. 7, 1985 [JP] Japan ................................. 60-122468

[51] Int. Cl.⁴ ......................................... G08C 21/00
[52] U.S. Cl. ..................................... 178/18; 340/706
[58] Field of Search ................. 178/18, 19, 20; 382/3, 382/2, 1, 13; 310/322, 325, 366; 340/706

[56] References Cited

U.S. PATENT DOCUMENTS 3,808,364 4/1974 Veith ................................ 178/18 X
3,857,022 12/1974 Rebane et al. ................. 178/18 X

FOREIGN PATENT DOCUMENTS 56-101278 8/1981 Japan .
58-1427 1/1983 Japan .

OTHER PUBLICATIONS

A Sonic Pen: A Digital Stylus System, A. E. Brenner & P. de Bruyne, IEEE Transactions on Computers, Jun. 1970, pp. 546-548.
A Proposal For Input of Hand-Drawn Information to a Digital System, P. W. Woo, IEEE Transactions on Computers, Oct. 1964, pp. 609-611.
Graphic Sensor Using a Lamb Wave, Akira Ishii, S. Hashimoto, IEEE Ultrasonic Symposium, 1981, pp. 167-170.

Primary Examiner—Stafford D. Schreyer
Attorney, Agent, or Firm—Antonelli, Terry & Wands

[57] ABSTRACT

A tablet type coordinate input apparatus comprises a flat medium for propagating a longitudinal elastic wave, longitudinal elastic wave detecting elements disposed on part of the end-adjacent side surfaces or of the front surface of the flat medium, a longitudinal elastic wave input member having an end portion terminating in a sharp-pointed end and brought into pressure engagement at that end with any desired position on the surface of the flat medium to radiate the longitudinal elastic wave from that end, an amplifier circuit amplifying electrical signals indicative of the elastic wave detected by the detecting elements, a comparator circuit comparing the signals amplified by the amplifier circuit with a predetermined threshold voltage thereby generating delay pulse signals corresponding to the propagation times of the longitudinal elastic wave, a counter circuit counting the lengths of time elapsed from the time of radiation of the longitudinal elastic wave toward the flat medium as a result of pressure engagement of the input member therewith to the time of generation of the delay pulse signals, and a computing circuit computing the coordinates on the basis of the time signals applied from the counter circuit.

20 Claims, 32 Drawing Figures $U_1 > U_2 > U_3 > U_4 > U_5 > U_6$ $U_1 > U_2 > U_3 > U_4 > U_5$ FIG. 24
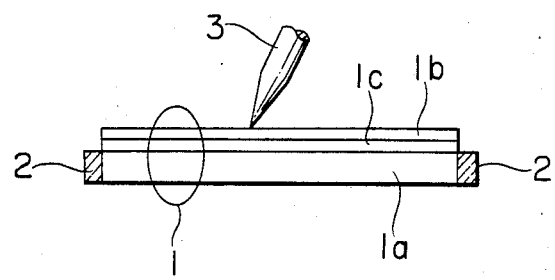
FIG. 25
FIG. 26
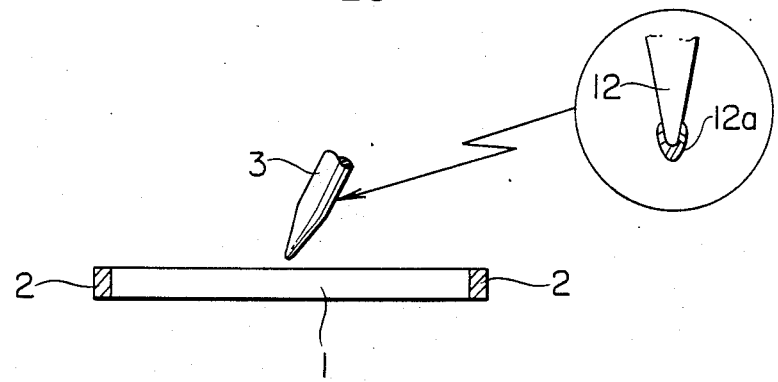

TABLET TYPE COORDINATE INPUT APPARATUS USING ELASTIC WAVE

BACKGROUND OF THE INVENTION

This invention relates to a tablet type coordinate input apparatus, and more particularly to an apparatus of the type using an elastic wave for detecting the coordinates of the position of an input pen.

Various types of coordinate input apparatus of this kind have been proposed hitherto and include (i) an aerial propagation type, (ii) a surface elastic wave type and (iii) a plate wave type. The apparatus of these types are disclosed in IEEE TRANSACTIONS ON COMPUTERS, Jun. 1970, pp. 546–548; IEEE TRANSACTIONS ON ELECTRONIC COMPUTERS, Oct. 1964, pp. 609–611; and IEEE 1981 ULTRASONIC SYMPOSIUM, pp. 167–170, respectively.

The apparatus of the type (i) is greatly affected by the environmental conditions including the temperature, and, therefore, correction of the adverse effect is required. Also, due to the fact that the apparatus is direcly affected by an obstruction such as the hand of the user, the apparatus cannot be used in a mode equivalent to the usual handwriting operation thereby giving a feeling of physical disorder to the user. In the case of the apparatus of the type (ii) too, the position of the input pen cannot be accurately identified when the user's hand touches the tablet, thereby giving also a feeling of physical disorder to the user. Although this type is suitable for application to a selective menu input apparatus applying an input by the finger touch, difficulty is encountered for its application to a tablet where a handwritten character or pattern is its input. The apparatus of the type (iii) is free from the defects of the two types (i) and (ii) described above, and the usual handwriting operation is possible. Transparent tablets utilizing this type and having a liquid crystal display unit and an EL display unit integrally combined therewith are disclosed in, for example, Japanese Unexamined Patent Publications Nos. 56-101278 and 58-14247 respectively. However, in the case of this type, difficulty is encountered for attaining stable and effective signal transmission and reception. This is because a plate wave whose propagation velocity is slightly lower than that of a longitudinal elastic wave is inevitably affected by the longitudinal elastic wave propagating earlier than that, and its phase changes inevitably with the increase in the propagation distance. Japanese Unexamined Patent Publication No. 56-101278 discloses a tablet in the form of a plate of an acrylic resin. The acrylic resin is a material in which sound propagates at a low velocity, and the tablet of this material has the advantage of improving the resolution. On the other hand, however, the large attenuation constant results in a complicated method for accurately detecting the propagation time of the plate wave, and the size of the tablet itself is restricted correspondingly.

SUMMARY OF THE INVENTION

It is an object of the present invention to provide a tablet type coordinate input apparatus in which the position of an input pen can be detected with high accuracy and high resolution at any position on an input medium.

Another object of the present invention is to provide an apparatus of the kind described above which permits application of an input with usual handwriting operation without being adversely affected by the touch of the user's hand with the input medium.

Still another object of the present invention is to provide an apparatus of the kind described above which can easily realize a display apparatus combined with an input apparatus in spite of a simple construction.

The present invention is featured by the fact that the coordinates of the position of an input pen are detected utilizing propagation of a longitudinal elastic wave component of an elastic wave.

In accordance with a preferred embodiment of the present invention, there is provided a tablet type coordinate input apparatus comprising flat medium means for propagating an elastic wave, detecting means disposed on part of the end-adjacent side surfaces or of the front surface of the medium means for detecting a leading wave of a longitudinal elastic wave of the elastic wave, elastic wave input means having an end portion terminating in a sharp-pointed end and brought into pressure engagement at that end with any desired position on the surface of the medium means to radiate the elastic wave from that end, and means receiving electrical signals indicative of the leading wave of the longitudinal elastic wave detected by the detecting means as a result of radiation of the elastic wave, thereby providing information of the identified engaging position of the input means.

The detecting means are preferably disposed at the corners of the side surfaces of the flat medium means. The end portion of the elastic wave input means is made of a material having an acoustic impedance substantially equal to that of the material forming the flat medium means.

The means for providing the information of the identified engaging position of the input means includes an amplifier circuit amplifying the electrical signals, a comparator circuit comparing the signals amplified by the amplifier circuit with a predetermined threshold voltage thereby generating delay pulse signal corresponding to the propagation time of the longitudinal elastic wave, a counter circuit counting the length of time elapsed from the time of radiation of the longitudinal elastic wave to the time of generation of the delay pulse signals, and a computing circuit computing the coordinates on the basis of the time signals applied from the counter circuit.

The elastic wave input means is in the form of a wave-guide rod of axial symmetry. One of the ends of the wave-guide rod is sharp-pointed and is freely brought into pressure engagement with any desired position on the surface of the flat medium means, while, the other end of the waveguide rod has a planar shape perpendicular to the symmetrical axis of the wave-guide rod.

In accordance with another preferred embodiment of the present invention, a piezoelectric element is used as part of the longitudinal elastic wave input means, and piezoelectric elements are also used as the longitudinal elastic wave detecting means.

According to the present invention which utilizes the longitudinal elastic wave propagating throughout the input medium means, a touch on the input medium means by the hand of the user does not adversely affect the identification of the input position, and the input means can be actuated by the usual handwriting operation.

Further, both the elastic wave incidence efficiency and the transmission-reception efficiency can be improved so that the longitudinal elastic wave can be detected with high accuracy. Further, since any specific region giving rise to generation of a mal-input is not present on the input medium means, the input position of the wave input means can be detected with high accuracy and high resolution at any position on the input medium means.

Furthermore, the input medium means can be formed of a transparent material so that a display apparatus combined with an input apparatus can be easily provided.

According to another embodiment of the present invention, a high-accuracy tablet utilizing an ultrasonic wave can be provided since an undesirable variation of the waveform of the output from the input medium means due to tilting or inclination of the pen can be reduced, and, especially, an inversion of the phase can be prevented. Also, the construction of the tablet can be simplified as compared to that of a prior art tablet in which a waveform variation is corrected by adding a special detection circuit and a correcting circuit.

Other objects, features and advantages of the present invention will become more apparent from the following detailed description taken in conjunction with the accompanying drawings.

BRIEF DESCRIPTION OF THE DRAWINGS

FIG. 24 shows the structure of another embodiment of the composite writable apparatus according to the present invention.

FIG. 25 shows another embodiment of the present invention including an improved input pen.

FIG. 26 is an enlarged view of part of the input pen shown in FIG. 25.

DESCRIPTION OF THE PREFERRED EMBODIMENTS

Figure 1:
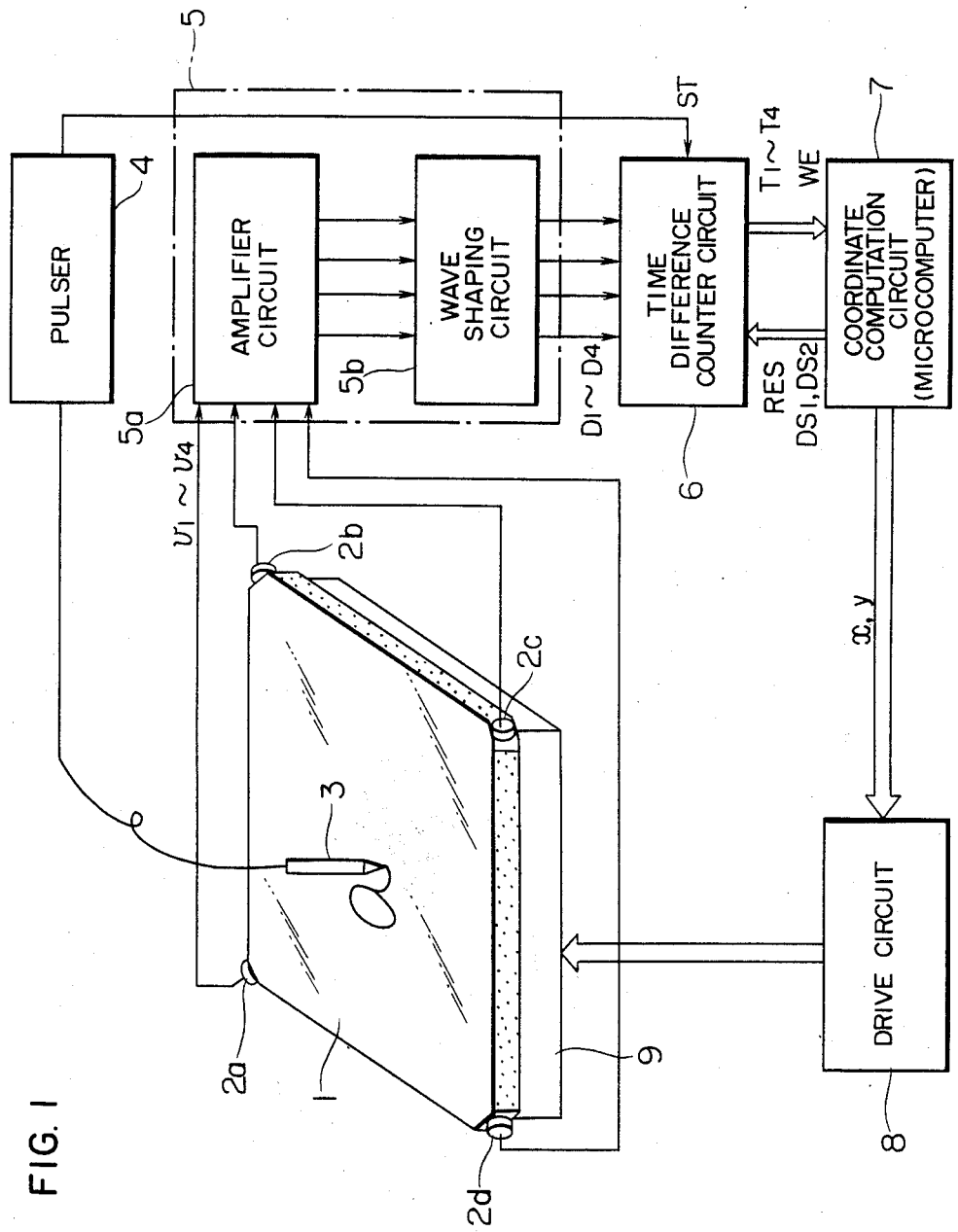
FIG. 1 is a diagrammatic view showing the structure of an embodiment of the apparatus according to the present invention.

FIG. 1 shows the structure of an embodiment of the apparatus according to the present invention. Referring to FIG. 1, input medium means 1 is in the form of a flat plate of a transparent material such as glass. A display unit 9 is disposed on the near surface of the input medium means 1. Input means 3 is in the form of, for example, an input pen or display pen having built-in means for generating a longitudinal elastic wave. One end of the display pen 3 is sharp-pointed, and a longitudinal elastic wave is radiated from this sharp-pointed end as described later. By the provision of the sharp-pointed end, the radiated elastic wave has a very large energy density which improves the efficiency of elastic wave radiation. Piezoelectric elements 2a, 2b, 2c and 2d acting as longitudinal wave detecting means are disposed at the marginal end portions of the transparent flat plate 1 repectively. These longitudinal wave detecting elements 2a to 2d detect the longitudinal elastic wave propagating through the transparent flat plate 1 and generate electrical signals.

The display unit 9 is capable of displaying any patterns and characters and is, for example, a liquid crystal display. Under command of a display drive circuit 8, a pattern drawn by the display pen 3 on the transparent flat plate 1 is displayed on the display unit 9. Thus, a pattern being drawn by the display pen 3 is immediately displayed on the display unit 9. The length of time elapsed from the time of drawing to the time of display is very short so that the user can observe the pattern display while drawing the pattern by the display pen 3.

Processing between the time of drawing and the time of display is executed by the combination of a pulser 4, a leading wave detection circuit 5, a time difference counter circuit 6, a coordinate computation circuit 7 and the display drive circuit 8 in a manner as described later.

The pulser 4 generates pulses periodically. Such pulses are applied to the display pen 3 and time difference counter circuit 6. The pulse applied to the display pen 3 triggers the generator of the longitudinal elastic wave, and the display pen 3 radiates the longitudinal elastic wave each time it receives a pulse. The time difference counter circuit 6 counts the length of time elapsed until an electrical signal indicative of a reflected wave is applied from each of the detecting elements 2a to 2d after the display pen 3 receives a pulse from the pulser 4.

The leading wave detection circuit 5 includes an amplifier circuit 5a and a wave shaping circuit 5b and detects the leading wave of the reflected wave, that is, the first wave of the longitudinal elastic wave, detected by each of the detecting elements 2a to 2d.

The coordinate computation circuit 7 computes the position of the display pen 3 in response to the application of the time difference data from the time difference counter circuit 6. The display drive circuit 8 drives the display unit 9 for displaying the computed position.

In operation, the pulser 4 applies its output pulses periodically to the display pen 3 and time difference counter circuit 6. The pulse applied to the display pen 3 has electrical power high enough for generation of the longitudinal elastic wave. The pulse applied to the time difference counter circuit 6 may have a very small amplitude since it is merely required to command the starting timing of counting the time difference from the time of generation of the longitudinal elastic wave.

The display pen 3 generates the longitudinal elastic wave each time an exciting pulse from the pulser 4 is applied thereto. The longitudinal elastic wave is radiated from the sharp-pointed end of the display pen 3 toward the transparent flat plate 1 each time the display pen 3 receives the pulse in the course of drawing a pattern or a character by the user. The longitudinal elastic wave radiated from the sharp-pointed end of the display pen 3 propagates through the transparent flat plate 1 to reach the detecting elements 2a to 2d. The period of time from the time of application of the pulse from the pulser 4 to the time of radiation of the longitudinal elastic wave from the display pen 3 is very short or negligible. Therefore, the periods of time from the time of pulse application to the time of arrival of the longitudinal elastic wave at the detecting elements 2a to 2d are proportional to the distances between the display pen 3 and the individual wave detecting elements 2a to 2d respectively. The elastic wave generated in response to the application of one pulse and required to be detected by each of the detecting elements 2a to 2d is the leading wave, that is, the first wave of the longitudinal elastic wave, and the leading wave detection circuit 5 detects an electrical signal corresponding to the leading wave detected by each detecting element.

The time difference counter circuit 6 counts the time difference between the time of pulse application and the time of leading wave detection for each of the detecting elements 2a to 2d. The coordinate computation circuit 7 computes the position of the display pen 3 at that time on the basis of the time differences counted for the individual detecting elements 2a to 2d. In order to display the computed position of the display pen 3 on the display unit 9, the display drive circuit 8 drives the display unit 9. Thus, the display unit 9 displays the position of the display pen 3 while tracing the movement of the display pen 3.

Figure 2:
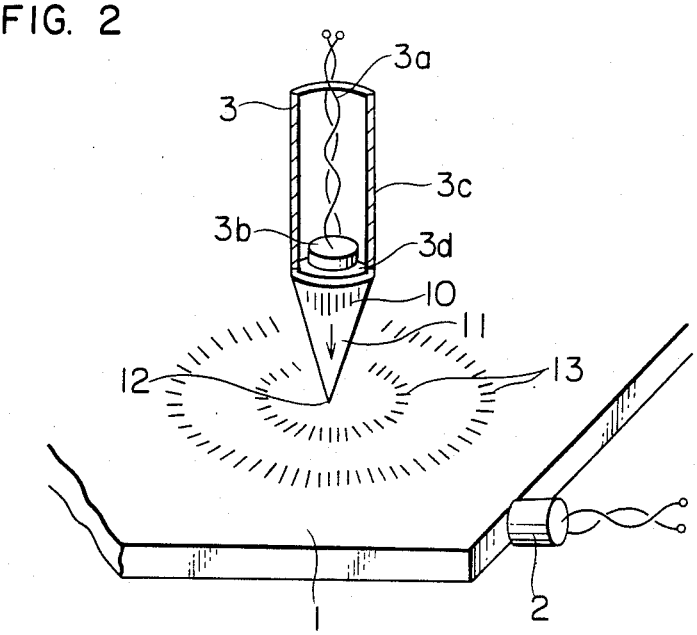
FIG. 2 is an enlarged view of part of FIG. 1.

FIG. 2 shows in detail the structure of one form of the display pen 3. Referring to FIG. 2, the display pen 3 includes a conical end portion 10 having a sharp-pointed end 12, an elastic wave generator 3b radiating a longitudinal elastic wave toward the conical end portion 10, and a hollow cylindrical outer casing 3c. The elastic wave generator 3b is bonded or otherwise fixed to a flat or planar portion 3d of the conical end portion 10. Leads 3a extending into the cylindrical casing 3c from the exterior are soldered to the elastic wave generator 3b, so that the pulse from the pulser 4 is applied to the elastic wave generator 3b through the leads 3a.

The elastic wave generator 3b is, for example, a piezoelectric element. The elastic wave generator 3b radiates the elastic wave 11 toward the end portion 10 in response to the application of the pulse from the pulser 4. The elastic wave 11 propagates through the end portion 10 toward the sharp-pointed end 12 to be radiated toward the transparent flat plate 1 from the sharp-pointed end 12. In the transparent flat plate 1, the elastic wave propagates in radial directions 13 from the sharp-pointed end 12 which is the center of propagation. The propagating elastic wave is detected by the individual detecting elements 2a to 2d.

The elastic wave propagating through the solid plate 1 includes various modes such as a longitudinal wave, a transverse wave and a surface wave. Among those waves, the longitudinal wave propages at a highest velocity, and the first wave of this longitudinal wave is detected as the leading wave.

Figure 3:
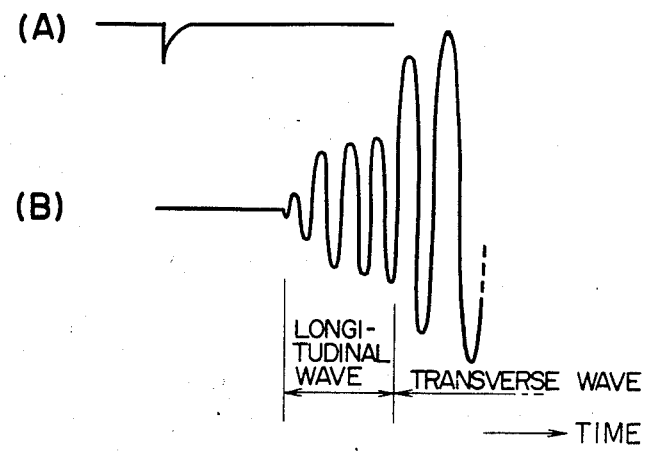
FIGS. 3A and B, and 4 illustrate the basic principle of propagation of an elastic wave.

FIG. 3 shows in (A) the pulse applied from the pulser 4 to the elastic wave generator 3b through the leads 3a and in (B) the wave detected by each of the detecting elements 2a to 2d. It will be apparent from FIG. 3 (B) that the longitudinal wave is the leading wave which is detected earlier than the transverse wave, and the succeeding transverse wave is excluded from the object of detection.

Figure 4:
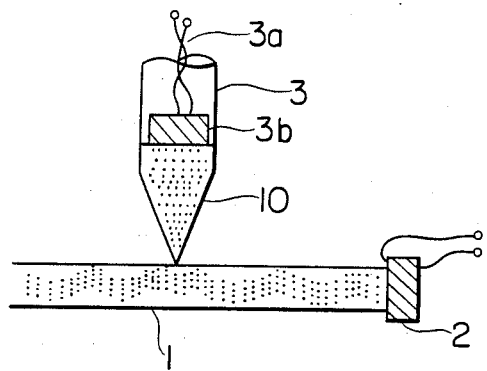

FIG. 4 illustrates how the elastic wave radiated from the display pen 3 propagates through the transparent flat plate 1. (In FIG. 4, the display unit 9 is omitted for conveniences of illustration.) In response to the application of an exciting pulse by way of the leads 3a, the elastic wave generator 3b built in the display pen 3 radiates the elastic wave.

This elastic wave has a thicknesswise oscillating component and a radial oscillating component, and these two wave components propagate through the conical end portion 10 of the display pen 3. The elastic wave enters the transparent flat plate 1 from the point of contact between the sharp-pointed end 12 of the display pen 3 and the plate 1. In the transparent flat plate 1, a mode conversion occurs to provide an elastic wave which is an intermixture of a longitudinal wave component and a transverse wave component as shown, and such an elastic wave propagates through the plate 1.

The propagation velocity of the longitudinal wave component is about two times as high as that of the transverse wave component. Thus, the longitudinal wave component is detected by the detecting elements 2a to 2d earlier than the transverse wave component, to be utilized to detect the position of the display pen 3. The reason why the longitudinal elastic wave is utilized for the position detection will be described in detail presently.

The inventors have discovered the fact that the frequency of the longitudinal wave component propagating through the transparent flat plate 1 is generally equal to the frequency of the radial oscillation component of the elastic wave radiated from the elastic wave generator 3b and propagating toward the end portion 10 of the display pen 3.

The elastic wave propagating through the transparent flat plate 1 has a complex waveform which is an intermixture of a longitudinal wave component and a transverse wave component as described above. However, the elastic wave initially arriving at the detecting elements 2a to 2d does not include the transverse wave component. Therefore, the very simple longitudinal wave component only, as shown in FIG. 3, can be detected. When the distance between the display pen 3 and each of the detecting elements 2a to 2d is changed, the waveform, especially, the amplitude of the elastic wave having the transverse wave component therein changes complexly, resulting in difficulty of counting the propagation delay corresponding to each distance. In contrast, when the longitudinal wave component only is detected, its amplitude does not make a complex change except for the effect of attenuation, even when the distance between the display pen 3 and each of the detecting elements 2a to 2d is changed. Therefore, when this waveform is used for the purpose of detection, the propagation delay corresponding to the distance can be sufficiently counted. Further, since the longitudinal wave propagates through the interior of the transparent flat plate 1, a hand touch on the surface of the plate 1 would not adversely affect the result of detection.

The amplitude of the longitudinal wave component is very small compared with that of the transverse wave component. It is therefore desirable that the efficiency of incidence of the elastic wave from the display pen 3 upon the transparent flat plate 1 be as high as possible for the purpose of detection with better accuracy.

On the basis of such a finding, the detecting elements 2 and the elastic wave generator 3b are so constructed that the radial resonance frequency of the elastic wave generated from the elastic wave generator 3b of the display pen 3 is generally equal to the thicknesswise resonance frequency or the radial resonance frequency of the detecting elements 2 disposed on the side surfaces of the transparent flat plate 1. It is further desirable to take into consideration the impedance matching between the acoustic impedance of the end portion 10 of the display pen 3 and that of the transparent flat plate 1. Thus, a stable longitudinal waveform having an amplitude sufficiently permitting counting of the propagation delay can be obtained.

The longitudinal wave which is sufficiently stable can be provided when the detecting elements 2 and the elastic wave generator 3b are formed of a piezoelectric ceramic material which is preferably lead titanatezirconate. Further, when the material of the transparent flat plate 1 is soda lime glass, the material of the end portion 10 of the display pen 3 is preferably soda lime glass or aluminum.

Figure 5:
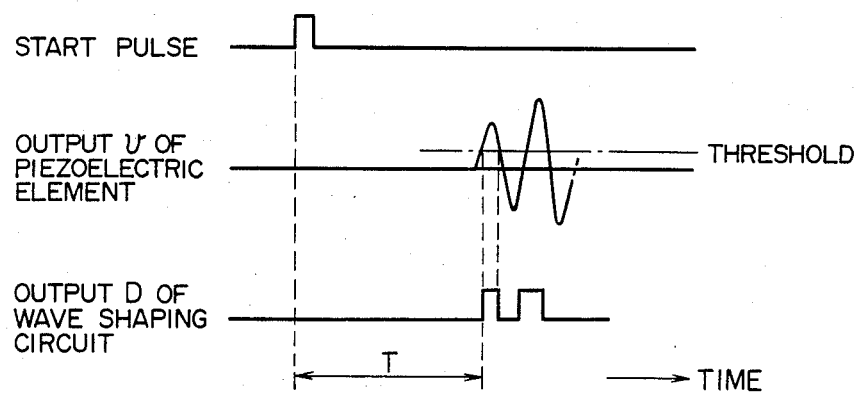
FIGS. 5 and 6 illustrate the manner of detection of the elastic wave.
Figure 6:
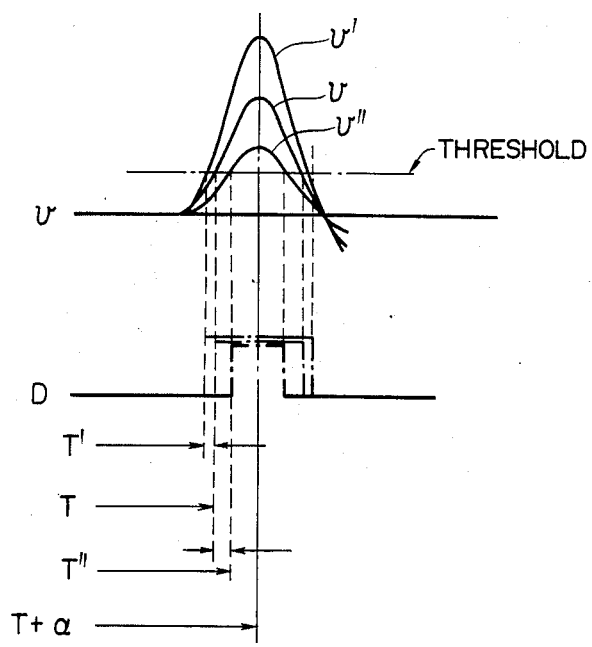
Figure 7A:
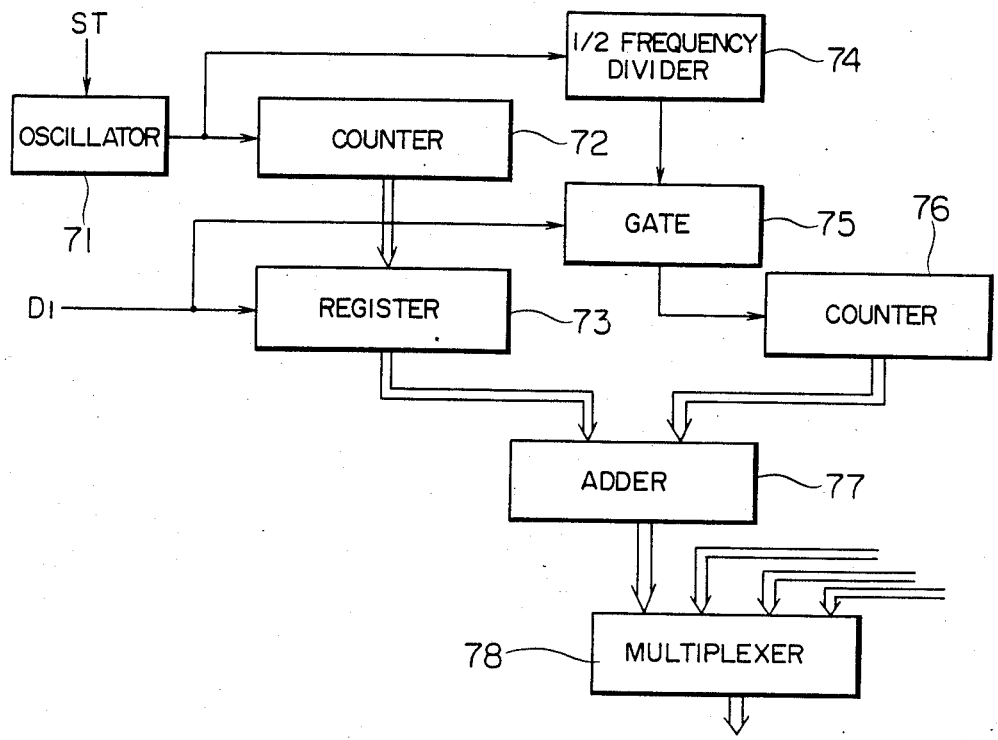
FIGS. 7A and 7B show one form of the manner of time counting according to the present invention.
Figure 7B:
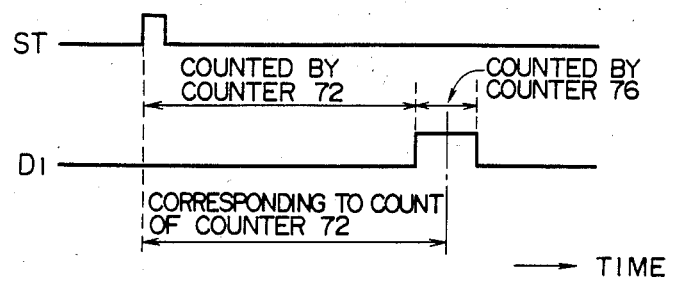

FIGS. 5 and 6 show how to detect the period of time T elasped from the time of generation of a start pulse ST and a high voltage pulse from the pulser 4 to the time at which the longitudinal elastic wave propagating through the transparent flat plate 1 arrives initially at one of the detecting elements 2a to 2d. As shown in FIG. 5, after the analog output waveform v of the elastic wave arriving at one of the detecting elements is amplified by the amplifier circuit 5a of the leading wave detecting circuit 5, the analog output waveform v is converted into a digital output D in the wave shaping circuit 5b as a result of comparison with a predetermined threshold level, and, in the time difference counter circuit 6, the period of time T elapsed from the time of application of the start pulse ST to the time of appearance of the first pulse of the digital output D is detected. The analog output v of the elastic wave changes relative to the predetermined threshold level depending on, for example, the writing pressure imparted to the display pen 3, as shown in FIG. 6. The most extreme case of this change is an instantaneous up change (out of contact) or an instantaneous down change (abrupt contact) of the display pen 3 relative to the transparent flat plate 1. A waveform change as shown in FIG. 6 is desirably corrected in the circuits including the time difference counter circuit 6. In the embodiment of the present invention, the period of time elapsed until the time of attainment of the peak value of the waveform is based to correct the waveform change. That is, with the change of the analog waveform in the order of v'', v and v' relative to the predetermined threshold level, the period of time elapsed from the time of application of the start pulse ST to the time of appearance of the first pulse of the digital output D changes in the order of T'', T and T' respectively. In each of the above cases, the period of time elapsed until the time attainment of the peak value of the analog waveform does not change and has a constant value of $(T+\alpha)$. Therefore, when the period of time $T_1$ elapsed until the rising waveform passes the threshold level and the period of time $T_2$ elapsed until the falling waveform passes the threshold level are counted, and the propagation time is defined as the $(T_1+T_2)/2$, the period of time T can be detected with high accuracy without being adversely affected by the waveform change attributable to, for example, the writing pressure. In an embodiment of the present invention, the above manner of accurate detection of the propagation time is realized by an arrangement as shown in FIGS. 7A and 7B. According to the illustrated arrangement, counting of $T_1$ and $T_2$ for determining the single propagation time is unnecessary. More precisely, as shown in FIG. 7A, the period of time $T_1$ is counted in a first counter 72 which counts the number of clock pulses applied from an oscillator 71, and the data is registered in a register 73. Counting of the period of time of from $T_1$ to $T_2$, includes dividing the frequency of the clock output of the oscillator 71 by the factor of 2 by a ½ frequency divider 74, counting the number of output pulses of the frequency divider 74 by a second counter 76 through a gate circuit 75, adding the count of the second counter 76 by an adder 77 to the data registered in the register 73, and applying the resultant data to a multiplexer 78. In the manner described above, the period of time elapsed from the time of application of the start pulse ST to the time corresponding to the center of the pulse width of the pulse of the digital output D, can be counted as shown in FIG. 7B.

The length of time required for the computation of (x, y) coordinates is shortened in a manner as described now.

Figure 8:
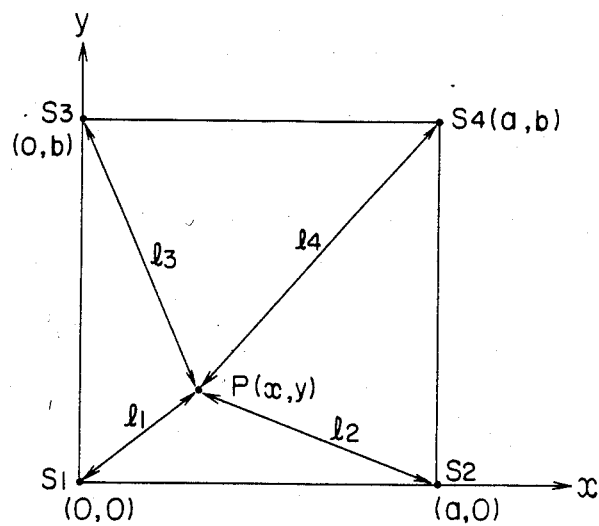
FIG. 8 illustrates how the coordinates of the display pen or input pen are computed.
Figure 9:
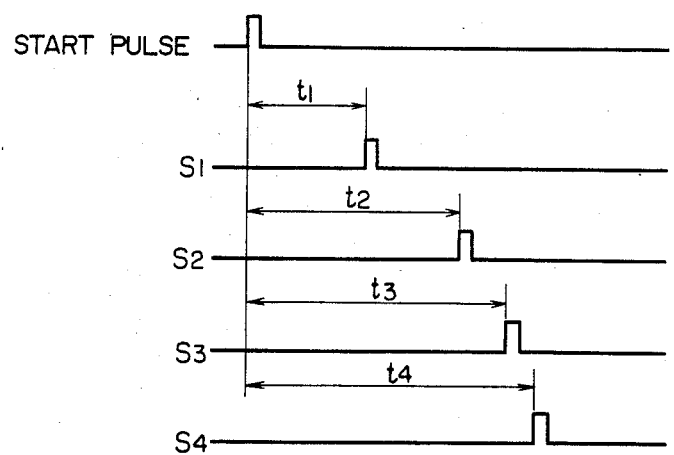
FIG. 9 illustrates the propagation delay time.

In FIG. 8, the symbols $S_1$ to $S_4$ designate the positions of the detecting elements respectively, and the point P (x, y) designates the position of the display pen 3 to be detected. Suppose that $\overline{S_1 S_2}=a$, $\overline{S_1 S_3}=b$, and $v_p$ is the propagation velocity of the longitudinal elastic wave. Then, on the basis of the propagation delay times $t_1$ to $t_4$ shown in FIG. 9, the coordinated (x, y) of the point P can be computed from the following equations:

$$\begin{cases} l_1 = v_p t_1, \ l_2 = v_p t_2, \ l_3 = v_p t_3, \\ l_4 = v_p t_4 \end{cases} \quad (1)$$

$$\begin{cases} x = \frac{a}{2} + \frac{1}{2a}(l_1 + l_2)(l_1 - l_2) \quad (2)\\ \\ y = \frac{b}{2} + \frac{1}{2b}(l_1 + l_3)(l_1 - l_3) \quad (3) \end{cases}$$

or $$\begin{cases} x = \frac{a}{2} + \frac{1}{2a}(l_3 + l_4)(l_3 - l_4) \quad (4)\\ \\ y = \frac{b}{2} + \frac{1}{2b}(l_2 + l_4)(l_2 - l_4) \quad (5) \end{cases}$$

According to the illustrated embodiment, six times of addition and subtraction, and four times of multiplication, that is, a total of 218 steps are merely required for the computation of the coordinates using the equations (2) and (3). Thus, the number of steps can be decreased to about ⅔ of the value heretofore required. It can be understood that the effect becomes more marked when the number of digits used for the computation is increased.

When the propagation velocity of the longitudinal elastic wave is subject to a change due to, for example, the ambient temperature, an idle or dead time range in the process of computation can be utilized for the computation of a correction coefficient. In the case of the transparrent flat plate 1 of glass employed in the illustrated embodiment, the propagation velocity of the longitudinal elastic wave changes by about ±5% relative to a temperature change of 25° C.±25° C. For example, when the initial setting is applied in spite of a velocity increase, the measured values of the distances become smaller resulting in a position identification error. A method for correcting the error includes, for example, monitoring the detection points $S_1$ and $S_2$, monitoring $x_{12}$ which is the value of x computed at the wave source P together with the detection points $S_1$ and $S_3$, and monitoring the difference $|x_{12}-x_{13}|$ between $x_{12}$ and $x_{13}$ computed at the wave source P. When a change in the propagation velocity is detected, and the value $|x_{12}-x_{13}|$ becomes smaller than an allowable limit, the value of the velocity at that time is stored to be used in later computation. The change in the propagation velocity is only about 0.2%/° C., and the temperature change rate is only about several minutes/° C. at the most. Therefore, the corrective computation at a rate of once per several minutes suffices, and the identification of the coordinate position is not appreciably affected.

While the above description has referred to the case of an orthogonal coordinate system by way of example, the present invention is also applicable to another coordinate system such as a polar coordinate system. It is apparent that the present invention is also applicable to an arrangement where the lines connecting the three detection points are not orthogonal to each other.

In the embodiment of the present invention, a fourth detection point $S_4$ is additionally provided to enhance the detection accuracy of the tablet. Suppose, for example, that $(x_1, y_1)$ represents the values of (x, y) computed according to the equations (1), (2) and (3), while, $(x_2, y_2)$ represents the values of (x, y) computed according to the equations (1), (4) and (5). Then, when the difference between $x_1$ and $x_2$ and the difference between $y_1$ and $y_2$ are not less than an allowable value, such values of x and y are not adopted as coordinate values. Thus, in the event of occurrence of an error in the count of the propagation time, appearance of a coordinate error signal can be reliably prevented.

Figure 10:
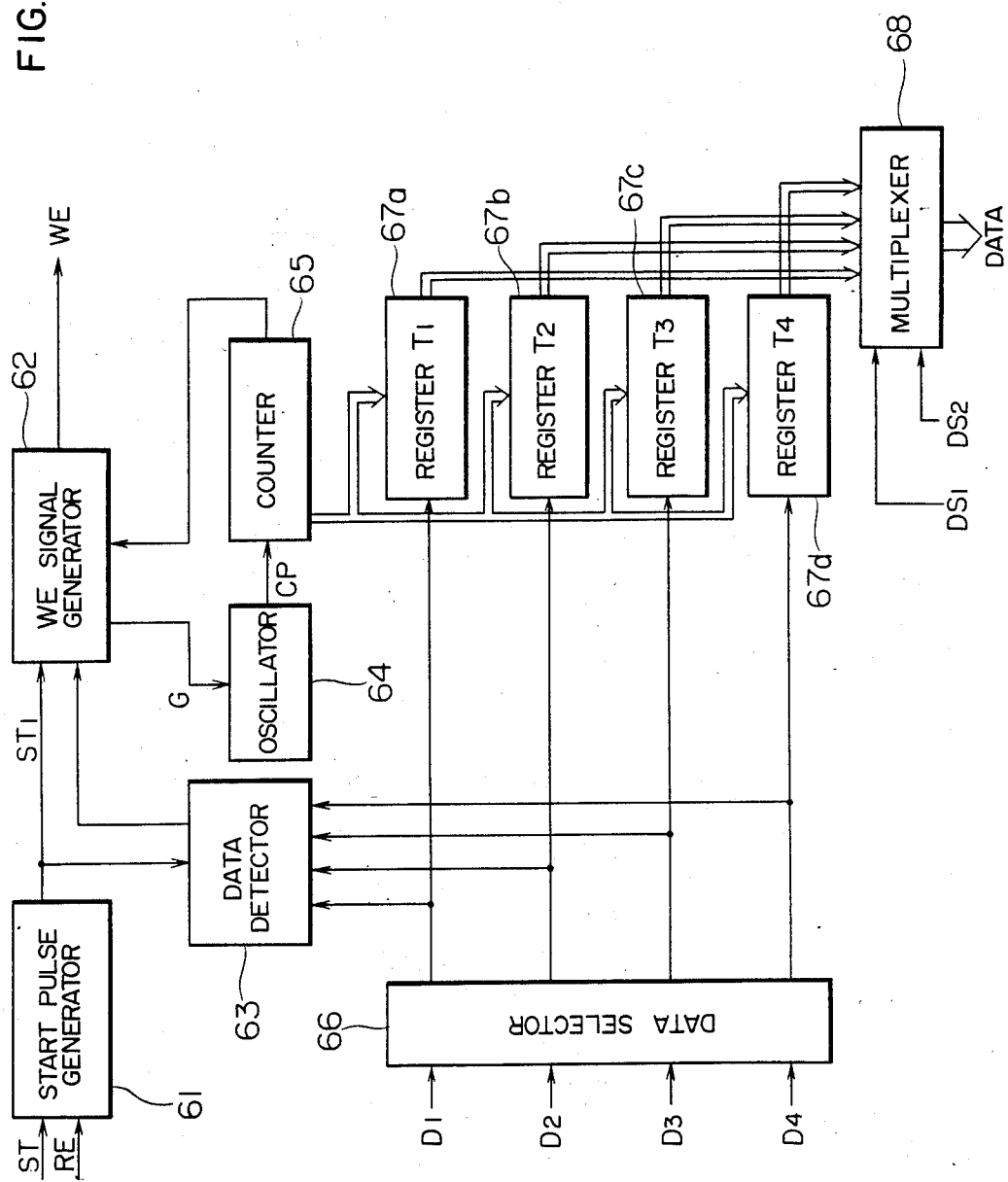
FIG. 10 shows the detailed internal structure of one form of the counter circuit shown in FIG. 1.
Figure 11:
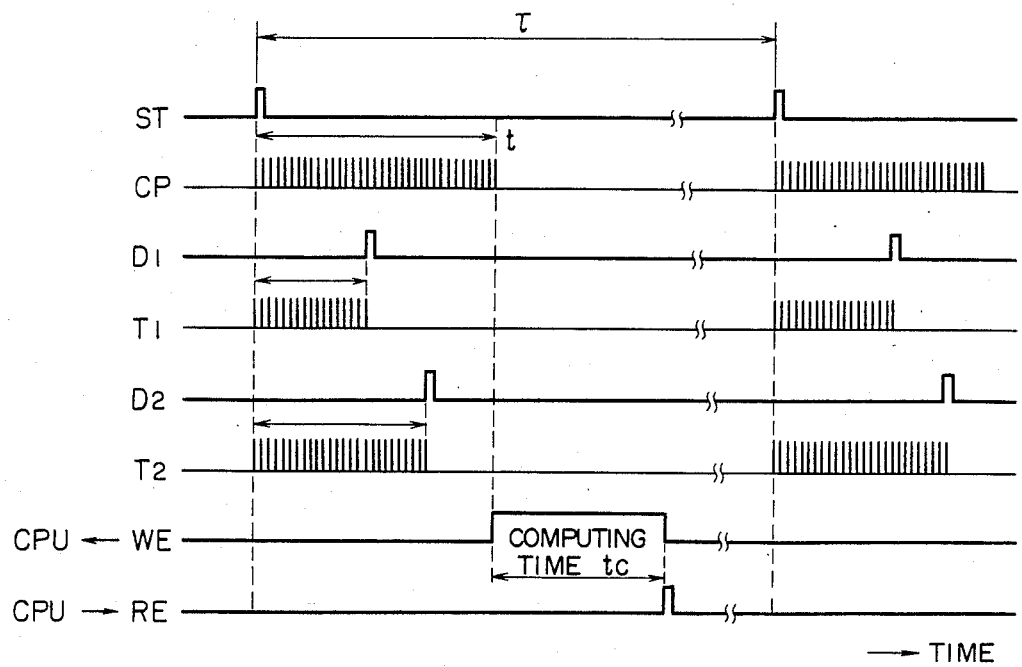
FIG. 11 is a time chart illustrating the operation of the structure shown in FIG. 10.

FIG. 10 shows the detailed internal structure of the time difference counter circuit 6 shown in FIG. 1. FIG. 11 is a time chart of various signals appearing in FIG. 10.

In FIG. 1, the data of propagation times $T_1$ to $T_4$ counted in the counter circuit 6 are supplied to the coordinate computation circuit 7 where the (x, y) coordinates are computed to be applied to an external unit. The (x, y) coordinate signal appearing from the coordinate computation circuit 7 (which is, for example, a microcomputer) is applied to the liquid-crystal drive circuit 8 which drives the liquid-crystal display unit 9 disposed directly beneath the transparent flat plate 1. Thus, a signal indicative of a character or a pattern drawn on the plate 1 by the display pen or input pen 3 held by the hand of the user can be applied to the display unit 9 while the user is confirming the character or pattern being displayed on the display unit 9 disposed directly beneath the transparent flat plate 1.

Referring to FIG. 10, the counter circuit 6 includes a start pulse generating circuit 61, a WE signal generating circuit 62, a data detection circuit 63, an oscillator 64, a counter 65, a data select circuit 66, registers 67a to 67d, and a multiplexer 68.

A start signal ST and a reset signal (RE) are applied to the start pulse generating circuit 61 from the pulser 4 and from the coordinate computation circuit or microcomputer 7 respectively. In response to the application of the start signal ST, a start pulse $ST_1$ is applied from the start pulse generating circuit 61 to the WE signal generating circuit 62 and data detection circuit 63. On the other hand, the output signals $D_1$ to $D_4$ from the wave shaping circuit 5b are applied through the data select circuit 66 to be checked in the data detection circuit 63, and, at the same time, applied as a count completion signal to the counter 65 which starts counting of basic clock pulses CP applied from the oscillator 64 in response to the application of the start pulse $ST_1$. The basic-clock counts $T_1$ to $T_4$ corresponding to the data signals $D_1$ to $D_4$ are registered in the $T_1$ to $T_4$ registers 67a to 67d respectively. In response to the application of data switch-over signals $DS_1$ and $DS_2$ from the microcomputer 7, the data corresponding to the propagation delay times detected by the respective detecting elements 2a to 2d are applied through the multiplexer 68 to the microcomputer 7. The WE signal generating circuit 62 would not generate the WE signal until all the data signals $D_1$ to $D_4$ are applied to the data detection circuit 63. As seen in FIG. 11, the WE signal is generated with a delay time t after the application of the start pulse $ST_1$ to the WE signal geneating circuit 62, and, in response to the application of the WE signal, the microcomputer 7 starts to compute the (x, y) coordinates of the input pen 3 on the basis of the data signals $D_1$ to $D_4$. Therefore, when any one of the data signals D to D4 is absent, the remaining three data are ignored as abnormal data and are not adopted for the computation of the coordinates. Such a situation tends to occur during, for example, the abrupt up and down movement of the input pen 3, and the above arrangement prevents mal-operation which may occur in such a case.

When the microcomputer 7 completes the computation of the (x, y) coordinates within the repetition period $\tau$ of the start pulse $ST_1$, the period $\tau$ determines the input speed in the tablet type coordinate input apparatus. Therefore, in order to increase the input speed, it is necessary to shorten the coordinate computation period of time $t_c$ and also to decrease ringing of the elastic wave shown in FIG. 3. The limit of the period of time elapsed until the WE signal is generated after the application of the start pulse $ST_1$ is determined by the factors including the clock frequency $f_c$ of the oscillator 64, the size of the transparent flat plate 1 and the propagation velocity $c_p$ of the longitudinal elastic wave. Since the resolution of the tablet is determined by the clock frequency $f_c$ and wave propagation velocity $c_p$, these factors should be taken into account. For minimizing the undesirable ringing of the elastic wave, the peripheral side surfaces of the transparent flat plate 1 are preferably covered with an elastic wave absorptive material such as rubber.

One end of the display pen 3 in the illustrated embodiment is sharp-pointed so that its position can be accurately identified, the acoustic energy can be radiated from such an end with a large density, and the coupling efficiency can be improved.

According to a conventional practice, a coupling agent such as water is interposed between the wave transmission part and the input medium part for the purpose of attaining a satisfactory coupling efficiency. In order to eliminate use of such a coupling agent and to attain propagation of the acoustic energy with high efficiency, the acoustic impedance of the end portion 10 of the display pen 3 is selected to be substantially equal or close to that of the propagation medium 1 in the illustrated embodiment. This impedance matching will be described in detail.

Suppose now that an elastic wave from a piezoelectric element mounted to a material I is incident through the material I upon another material II. Then, the factor of reflection of the material I reflecting the elastic wave is expressed as follows:

$$\text{Reflection factor} = \frac{Z_2 - Z_1}{Z_1 + Z_2} \times 100 \ (\%) \tag{6}$$

where $Z_1$ is the acoustic impedance of the material I, and $Z_2$ is that of the material II.

TABLE 1

| Material I of wave-guide rod | Acoustic impedance $Z_1$ ($10^6$ hg/mic) of material I | Factor of reflection to material I (%) | Factor of incidence on material II (%) |
|---|---|---|---|
| Acrylic resin | 3.2 | 63.8 | 36.2 |
| Aluminum | 16.9 | 7.6 | 92.4 |
| Glass | 14.5 | 0 | 100 |

*Acoustic impedance $Z_2$ of the material II (glass) is $Z_2 = 14.5$.

Table 1 shows computed examples of the factors of reflection and incidence when the material II is glass, and the material of the end portion 10 of the display pen 3 is changed. It will be seen in Table 1 that the factor of reflection of the material I decreases with the approach of the acoustic impedance of the material I to that of the material II. Thus, the elastic wave radiated from the material I can be efficiently incident upon the material II.

Figure 12:
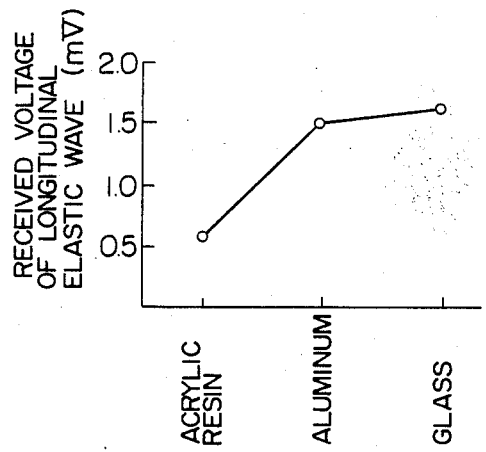
FIGS. 12 and 13 show experimental data obtained by the use of materials shown in Table 1.
Figure 13:
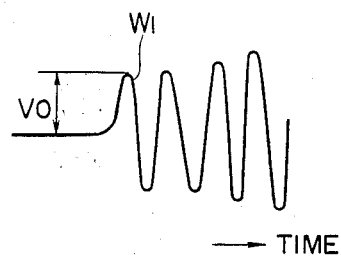

FIG. 12 shows the voltage received by the detecting element (the piezoelectric element) 2a when each of the materials shown in Table 1 forms the end portion 10 of the display pen 3, and the elastic wave is radiated toward the glass material I. In this case, the received wave is the leading wave of the longitudinal elastic wave. FIG. 13 shows the waveform of the detected longitudinal elastic wave, and the peak value $V_0$ of the leading wave $W_1$ provides the received voltage.

Figure 14:
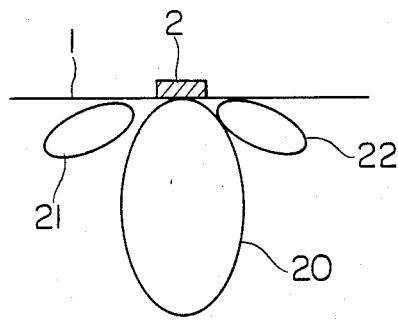
FIG. 14 is a schematic illustration of the sensitivity distribution.

FIG. 14 shows the directivity of the elasticwave detecting element 2 when a material such as a piezoelectric ceramic material is used to provide the solid oscillation element. When the solid oscillation element 2 acting as the elastic-wave detecting element is disposed on one of the side surfaces (except the corner) of the transparent flat plate 1, the amplitudes of the waveforms detected by the element are not necessarily the same due to the directivity even if the elastic wave is radiated from various positions spaced apart by the same distance from the element. According to the sensitivity distribution curve 20 shown in FIG. 14, the sensitivity is highest in the direction perpendicular to the oscillation element 2, and this direction indicates the major axis of the directivity. The sensitivity distributions 21 and 22 in FIG. 14 are called the side lobes.

Figure 15:
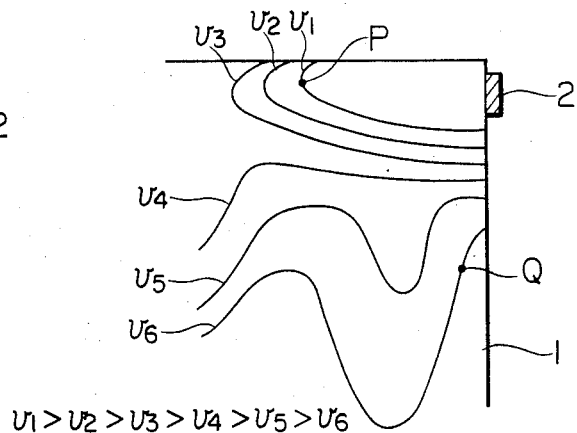
FIGS. 15 and 16 show the results of measurement of the sensitivity distribution.
Figure 16:
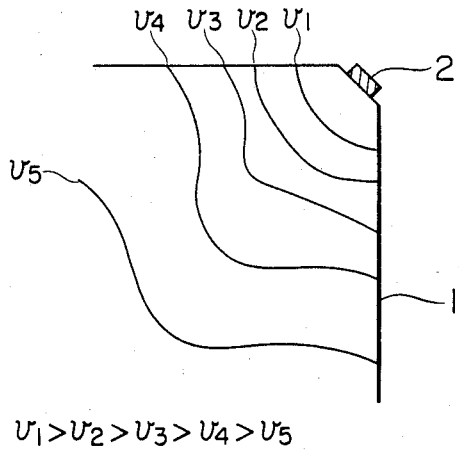

FIG. 15 shows the results of measurement of the sensitivity distribution when the major axis of directivity of each of the solid oscillation elements 2 mounted to the side surfaces of the transparent flat plate 1 is not directed toward the center of the plate 1. On the other hand, FIG. 16 shows the results of measurement of the sensitivity distribution when the major axis of directivity of each of the oscillation elements 2 mounted to the corners of the transparent flat plate 1 is directed toward the center of the plate 1. In FIGS. 15 and 16, the values $v_1$, $v_2$, $v_3$,—represent the voltage amplitudes of the detected waveforms.

When points P and Q spaced apart by the same distance from the oscillation element 2 in FIG. 15 are considered as oscillation sources, the detected waveforms have voltage amplitudes $v_1$ and $v_6$ which are not equal to each other. Thus, the results of computation indicate that the distance between the point P and the oscillation element 2 differs from that between the point Q and the oscillation element 2. The same applies to other points.

Figure 17:
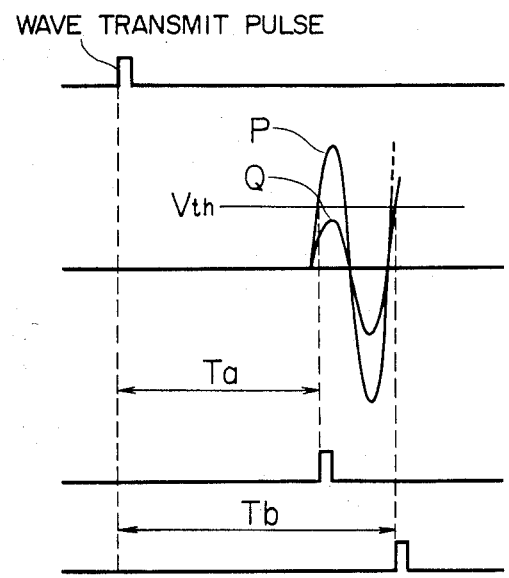
FIG. 17 illustrates waveform variations.

FIG. 17 shows the received waveforms corresponding to the points P and Q. In the received waveform corresponding to the point Q, the amplitude of its leading wave portion is small compared with that in the received waveform corresponding to the point P. When the threshold level of the detected waveform is Vth, the leading wave of the received waveform corresponding to the point Q cannot be picked up, and its second wave is picked up. Consequently, the length of time (the delay time or propagation time) elasped until the transmitted wave is received after application of a transmit pulse is represented by Ta for the first wave and Tb for the second wave (Tb > Ta), resulting in measurement of a wrong position.

On the other hand, in the case of FIG. 16, the oscillation element 2 has the directivity toward the center of the transparent flat plate 1. Therefore, the amplitude changes in proportion to a change in the distance only, and the situation shown in FIG. 15 does not occur. Thus, the corners of the transparent flat plate 1 are chamfered as shown in FIG. 16, and the oscillation element 2 is mounted to each of the chamfered corners.

Figure 18:
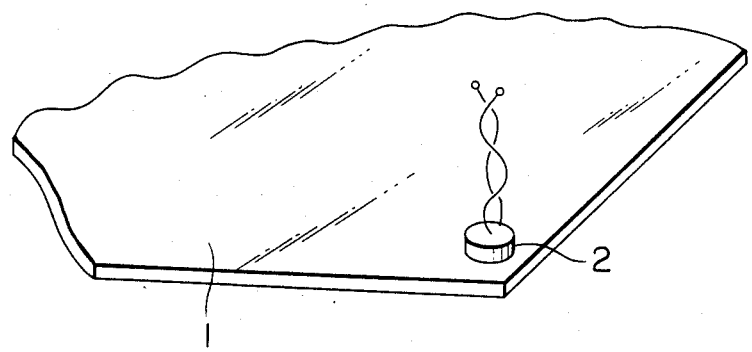
FIGS. 18 and 19 show after embodiments of the present invention respectively.

FIG. 18 shows part of a modification in which the detecting element 2 is disposed on the surface of the transparent flat plate 1. In such a case, it is effective to utilize the resonance frequency in the radial direction of the piezoelectric detecting element 2. This modification is especially effective when the transparent flat plate 1 has a small thickness.

In each of the above cases, the apparatus exhibits a marked effect when the piezoelectric element has a great difference between the resonance frequency in the thicknesswise direction and that in the radial direction. This is because, when these resonance frequencies are close to each other, the predetermined resonance frequency cannot be obtained due to the interference therebetween.

Figure 19:
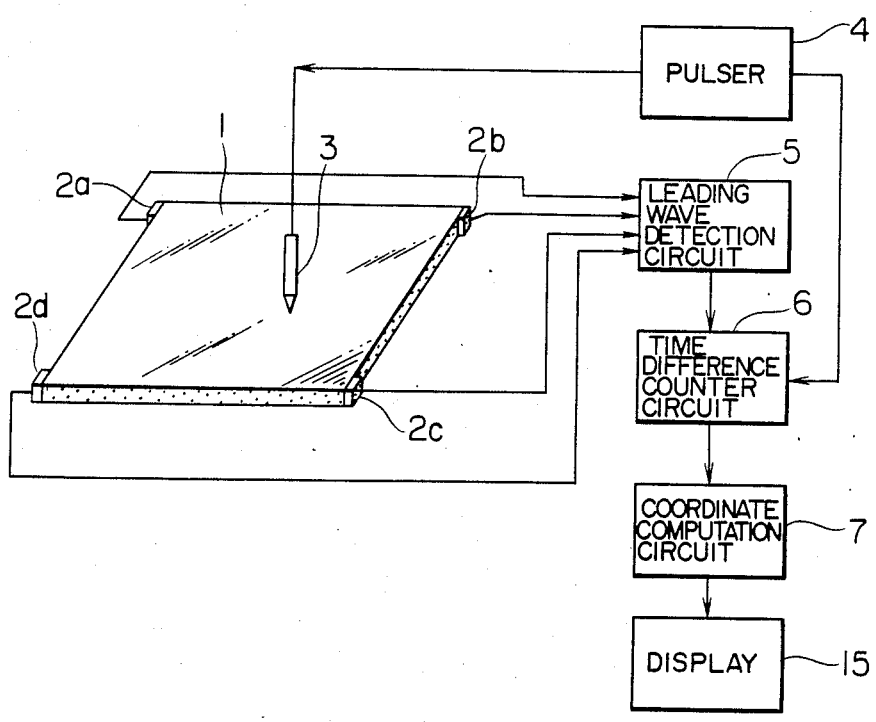

The aforementioned embodiments have referred to the arrangement in which the transparent flat plate 1 is coupled to the display unit 9. However, the result of identification of the position of the display pen 3 need not necessarily be displayed, and the signals indicative of the identified position may be applied to the computer or the like, as shown in FIG. 19. In such a modification, therefore, the apparatus functions merely as an input unit. Also, the transparent flat plate 1 may be replaced by an opaque plate.

Figure 20:
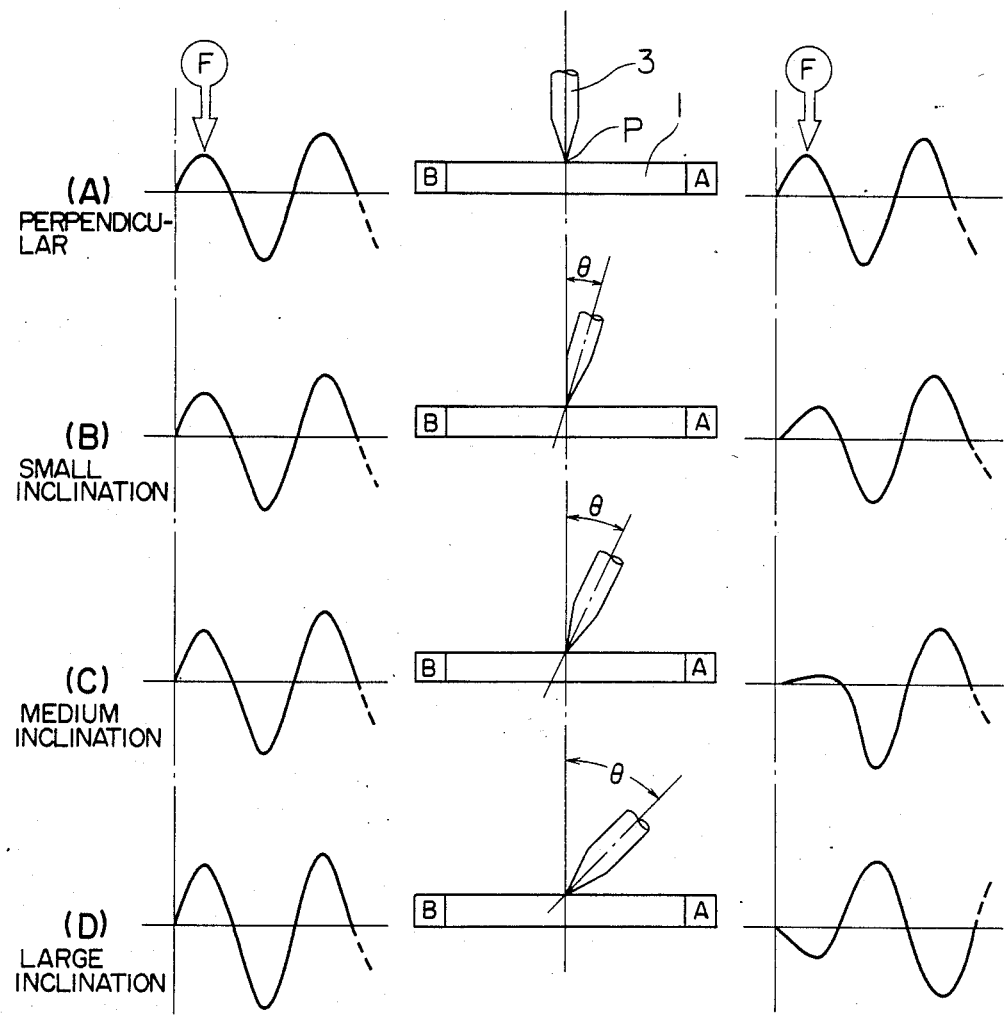
FIGS. 20A-B illustrate the relation between the inclination angle of the display pen or input pen and the waveforms detected by the detecting elements.

FIG. 20 illustrates how the waveform of a longitudinal ultrasonic wave applied to the leading wave detection circuit 6 changes depending on the angle of inclination of the display or input pen 3. FIG. 20 shows the waveforms detected by two longitudinal wave detecting elements A and B disposed on the both ends respectively of the writing-purpose transparent flat plate 1, when the longitudinal ultrasonic wave from the input pen 3 is incident upon a point P intermediate between the elements A and B. FIG. 20(A) shows the detected waveforms when the input pen 3 is perpendicular to the surface of the transparent flat plate 1, and it will be seen that the first wave F arrived is detected with the same phase by both the detecting elements A and B. In contrast, FIGS. 20(B), 20(C) and 20(D) show the detected waveforms when the input pen 3 is gradually inclined toward the detecting element A. In the case of the detecting element B, no change occurs in the phase of the detected waveform of the first wave F although there is a slight level change, whereas, in the case of the detecting element A, both the level and the phase of the detected waveform of the first wave F are subject to a change, and the phase is inverted in FIG. 20(D) where the inclination angle $\theta$ is largest. Therefore, when, for example, the peak of the first wave F is noted for the measurement of the propagation time, the propagation time tends to change depending on the inclination angle $\theta$ of the input pen 3, resulting in an error of the position identification.

Figure 21A:
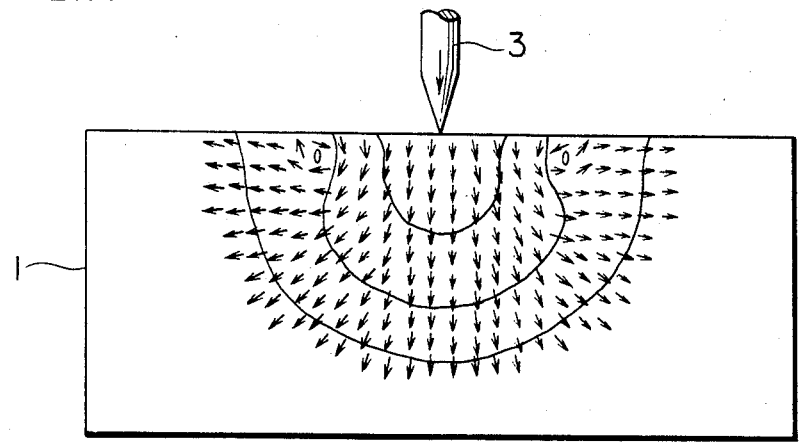
FIGS. 21A and 21B show the results of simulation of the behavior of an ultrasonic wave incident on the writable plate from the input pen.
Figure 21B:
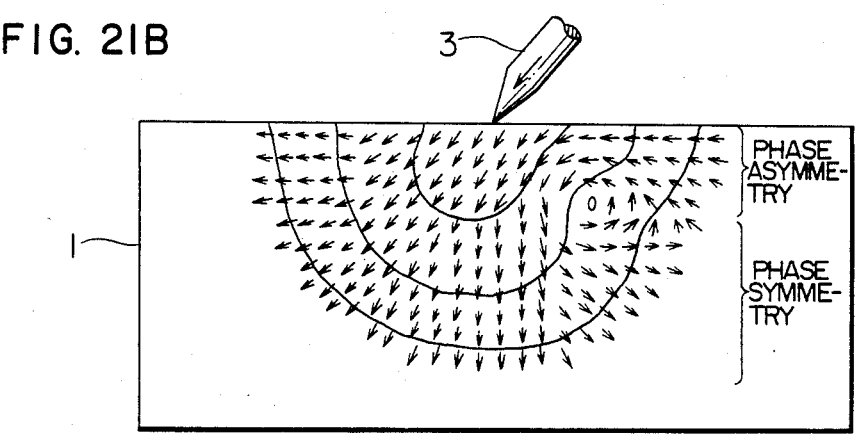

Analysis by simulation has proved that the tendency of changing of the detected waveform due to the inclination of the input pen 3 is caused by the fact that, in the components of the ultrasonic wave incident upon the medium 1, the component parallel to the surface of the medium 1 is affected by the inclination of the input pen 3. The results of the analysis are shown in FIGS. 21A and 21B. When the input pen 3 is perpendicular to the surface of the medium 1 as shown in FIG. 21A, it can be seen that the phase of the wave propagating in the medium 1 is symmetrical with respect to the pen 3. However, when the input pen 3 inclines as shown in FIG. 21B, it can be seen that the phase of the wave is inverted in a region of the surface of the medium 1 near the inclined input pen 3 and becomes asymmetrical with respect to the input pen 3. A more detailed analysis proves that this phase-inverted region is widened with the increase in the inclination angle $\theta$ of the input pen 3. It can be seen from the above facts that the phase of the wave component parallel to the surface of the medium 1 is directly affected by the inclination of the input pen 3, hence, by the wave component parallel to the surface of the medium 1 in the components of the ultrasonic wave incident upon the medium 1. Due to such a phenomenon, the inclination of the pen 3 gives rise to the change in the detected waveform.

However, careful observation teaches that the phase of the wave is not always inverted on the side where the input pen 3 is inclined. In other words, the phase of the wave is symmetrical around the pen 3 in the portion of the medium 1 deep from the medium surface beneath the point of incidence of the ultrasonic wave, especially, in the portion deeper than the portion where vortices shown by the arrows indicating the phase of the wave appear. Thus, when the wave of phase symmetry can be guided to the detecting elements earlier than the wave of phase asymmetry, the adverse effect due to the inclination of the pen 3 can be reduced to prevent the change of the detected waveform, especially, the inversion of the phase.

Figure 22:
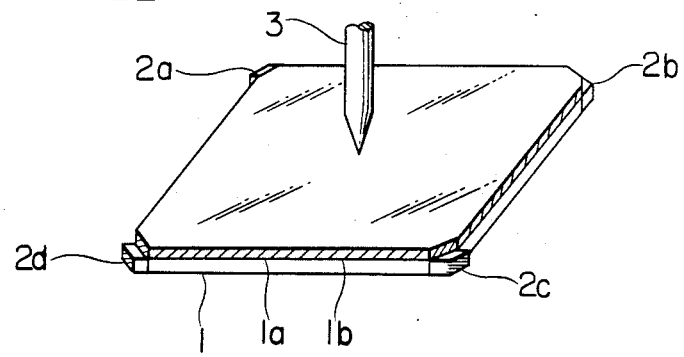
FIG. 22 shows the structure of an embodiment of a composite writable apparatus according to the present invention.

An embodiment of the present invention based on the above finding is shown in FIG. 22. Referring to FIG. 22, the apparatus embodying this aspect of the present invention comprises a writable plate 1 composed of at least two layers. More precisely, the writable plate 1 includes a laminar propagation medium 1a for propagating an ultrasonic wave and a laminar input medium 1b superposed on the medium 1a and formed of a material having a longitudinal wave propagation velocity lower than that of the medium 1a. Detecting elements 2a, 2b, 2c and 2d are mounted to the laminar propagation medium 1a.

Figure 23:
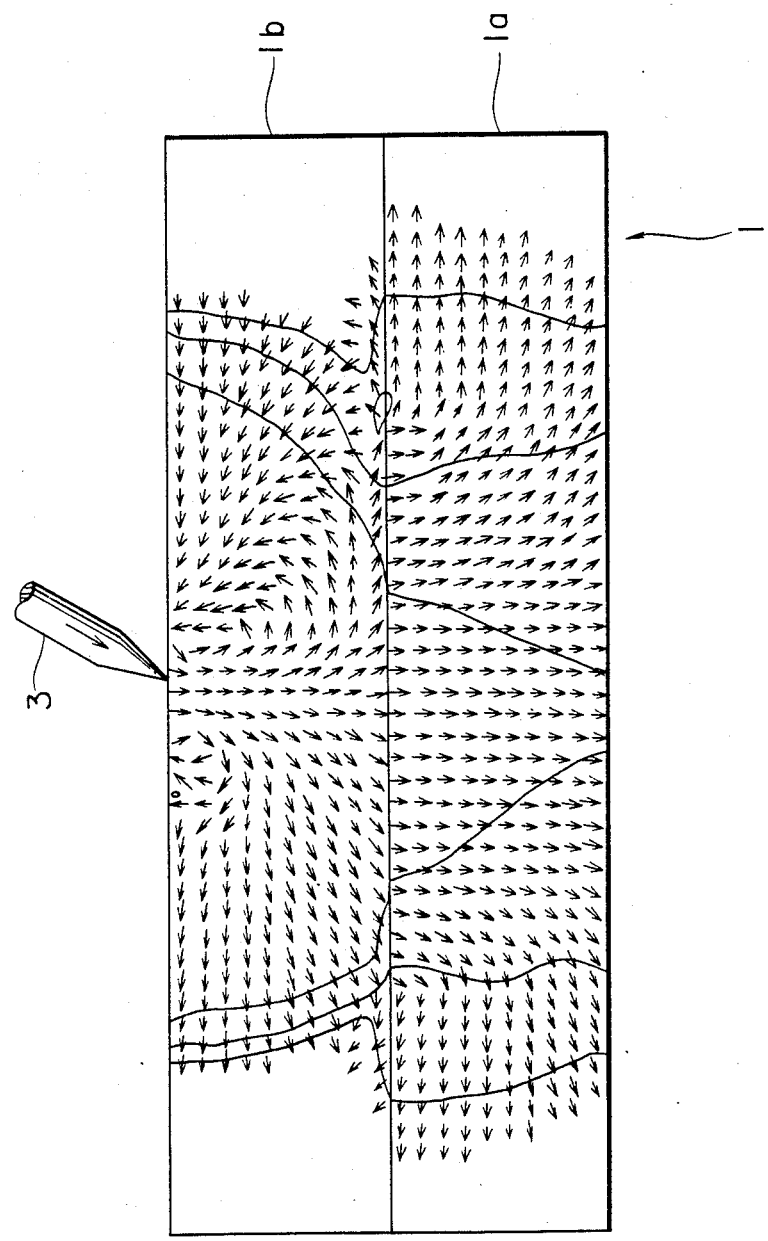
FIG. 23 shows the results of simulation to illustrate the effect of the composite structure employed in FIG. 22.

FIG. 23 shows the effect of the embodiment confirmed by simulation. Materials used in the analysis are shown in Table 2.

TABLE 2

| Density of materials used in analysis and velocity of sound | | |
|---|---|---|
| | Input layer of polycarbonate | Propagation layer of glass |
| Density (g/cm$^3$) | 1.2 | 2.7 |
| Velocity of sound | | |
| Longitudinal wave (m/sec) | 2,200 | 5,560 |
| Transverse wave (m/sec) | 950 | 3,480 |

It will be seen in FIG. 23 that, when the two medium layers 1a and 1b are provided, there appears a region where the phase is symmetrical regardless of inclination of the input pen 3. According to a further detailed analysis, it has been found that the region of the same and symmetrical phase increases with the increase in the thickness of the input layer 1b where the velocity of sound is lower, provided that the inclination of the pen 3 is maintained constant, while, the region of the same phase increases with the decrease in the inclination of the pen 3, provided that the thickness of the input layer 1b is maintained constant. It has been also found that, when the thickness of the input layer 1b is about the half of the wavelength, the region of the same phase does not increase regardless of the increase in the thickness of the input layer 1b. Thus, it can be seen that the thickness of the input layer 1b need not be excessively increased. It can also be seen that, when the velocity of sound in the input layer 1b is slowed, the thickness of the layer exhibiting the same effect can be made smaller.

From the aspect of practical use, it can be said that the required magnitude of the region of the same and symmetrical phase is about the half of the wavelength of the ultrasonic wave propagating the propagation layer 1a, at the practically maximum inclination of the pen 3. Thus, the thickness of the input layer 1b, where the velocity of sound is lower than that in the propagation layer 1a, is determined. More concretely, it has been found that, when the materials shown in Table 2 are used at the ultrasonic wave frequency of 400 kHz, the required thickness of the input layer 1b is 1.2 mm and 0.8 mm when the maximum inclination of the input pen 3 is 40° and 30°, respectively.

By constructing the tablet in the manner described above, the waveform variation due to the inclination of the pen 3 can be minimized, and, especially, the inversion of the phase can be prevented, so that the tablet using the ultrasonic wave can identify the position of the pen 3 with high accuracy.

The materials shown in Table 2 are transparent. Therefore, when the tablet formed of such transparent materials is laminated on the display screen of a liquid crystal display, a CRT display or the like, the tablet including the integrally combined input surface and display surface can be advantageously provided. There are various other materials which are transparent and have different propagation velocities of a longitudinal wave, and such materials can be combined as desired. The effect similar to that described above can also be attained even when two layers of the same material but having different acoustic properties are combined.

While the above description has referred to the transparent writable plate, it is apparent that opaque materials may be used to attain the same effect. For example, the adverse effect due to inclination of the pen 3 can be obviated when aluminum (having a longitudinal wave propagation velocity of 6,260 m/sec) is used as the laminar propagation medium 1a, and bakelite (having a longitudinal wave propagation velocity of 2,590 m/sec) is used as the laminar input medium 1b.

FIG. 24 shows another embodiment or a modification of the embodiment shown in FIG. 22. Referring to FIG. 24 which has a composite structure, a laminar intermediate medium 1c is interposed between the laminar propagation medium 1a and the laminar input medium 1b of the writable plate 1. This laminar intermediate medium 1c has a longitudinal wave propagation velocity intermediate between that of the laminar propagation medium 1a and that of the laminar input medium 1b. The effect of the embodiment shown in FIG. 24 is the same as that of the embodiment shown in FIG. 22.

Another embodiment shown in FIG. 25 differs from the embodiments shown in FIGS. 22 and 24 in that an improvement is made in the input pen 3. As shown in FIG. 26 which is an enlarged view, a contact-purpose small piece 12a is provided on the sharp-pointed end 12 of the input pen 3, and the material of this small piece 12a has a longitudinal wave propagation velocity lower than that of the writable plate 1. In this case, the material of the sharp-pointed end 12 of the pen 3 has preferably a longitudinal wave propagation velocity higher than that of the small piece 12a. The effect of the embodiment shown in FIG. 26 is also the same as that of the embodiment shown in FIG. 22, and the adverse effect due to inclination of the pen 3 can be obviated.

The composite writable plate 1 is made by bonding together a plurality of sheets having different sound propagation velocities, for example, by bonding a sheet of a polycarbonate resin or a sheet of an acrylic resin to a sheet of glass as usually practiced in the production of plywood. As another method, the composite writable plate 1 is made by laminating two laminar media of the same material but having different acoustic properties. Such media may be rendered to have different physical properties, for example, different specific gravities in the course of production although they are formed of the same material.

We claim:

1. A tablet type coordinate input apparatus using an elastic wave, comprising:
   medium means for propagating an elastic wave;
   elastic wave detecting means disposed on at least part of said medium means;
   elastic wave input means including elastic wave generating means for generating an elastic wave and for radiating the generating the generated elastic wave toward any desired position on the surface of said medium means; and
   means for receiving electrical signals indicative of a longitudinal elastic wave component of said radiated elastic wave detected by said detecting means, thereby providing coordinate information of the input position of said input means.

2. A tablet type coordinate input apparatus, comprising:
   flat medium means for propagating an elastic wave;
   detecting means disposed on part of one of the end-adjacent surfaces and the front surface of said medium means for detecting a leading wave of a longitudinal elastic wave component of said elastic wave;
   elastic wave input means including elastic wave generating means for generating an elastic wave, said elastic wave input means having an end portion terminating in a sharp-pointed end and brought into pressure engagement at said end with any desired position on the front surface of said medium means to radiate the generated elastic wave from said end; and
   means for receiving electrical signals indicative of the leading wave of the longitudinal elastic wave detected by said detecting means as a result of radiation of said elastic wave, thereby providing information of the identified engaging position of said input means.

3. A tablet type coordinate input apparatus as claimed in claim 2, wherein said detecting means are disposed at the corners of the side surfaces of said flat medium means, and said end portion of said elastic wave input means is made of a material having an acoustic impedance substantially equal to that of the material forming said flat medium means.

4. A tablet type coordinate input apparatus as claimed in claim 2, wherein said elastic wave input means is in the form of a wave-guide rod of axial symmetry, one end of which is sharp-pointed to be freely brought into pressure engagement with any desired position on the surface of said flat medium means, while the other end of which has a planar surface perpendicular to the symmetrical axis of said wave-guide rod to support a transmitting piezoelectric element thereon, and said detecting means disposed on part of one of the end-adjacent side surfaces and the front surface of said flat medium means include receiving piezoelectric elements.

5. A tablet type coordinate input apparatus as claimed in claim 3, wherein said elastic wave input means is in the form of a wave-guide rod of axial symmetry, one end of which is sharp-pointed to be freely brought into pressure engagement with any desired position on the surface of said flat medium means, while the other end of which has a planar surface perpendicular to the symmetrical axis of said wave-guide rod to support a transmitting piezoelectric element thereon, and said detecting means disposed on part of one of the end-adjacent side surfaces and the front surface of said flat medium means include receiving piezoelectric elements.

6. A tablet type coordinate input apparatus as claimed in claim 2, wherein said means for receiving the electrical signals includes an amplifier circuit amplifying said electrical signals, a comparator circuit comparing said signals amplified by said amplifier circuit with a predetermined threshold voltage thereby generating delay pulse signals corresponding respectively to the propagation times of said longitudinal elastic wave, a counter circuit counting the lengths of time elasped from the time of radiation of said longitudinal elastic wave toward said flat medium means as a result of pressure engagement of said input means therewith to the time of generation of said delay pulse signals, and a computing circuit computing the coordinates on the basis of the time signals applied from said counter circuit.

7. A tablet type coordinate input apparatus as claimed in claim 3, wherein said means for receiving the electrical signals includes an amplifier circuit amplifying said electrical signals, a comparator circuit comparing said signals amplified by said amplifier circuit with a predetermined threshold voltage thereby generating delay pulse signals corresponding respectively to the propagation times of said longitudinal elastic wave, a counter circuit counting the lengths of time elasped from the time of radiation of said longitudinal elastic wave toward said flat medium means as a result of pressure engagement of said input means therewith to the time of generation of said delay pulse signals, and a computing circuit computing the coordinates on the basis of the time signals applied from said counter circuit.

8. A tablet type coordinate input apparatus as claimed in claim 4, wherein said receiving piezoelectric elements are fixed at their surface perpendicular to the direction of polarization to the side surfaces of said planar medium means, while said transmitting piezoelectric element is fixed at its surface perpendicular to the direction of polarization to said planar surface of said waveguide rod, and the resonance frequency of said transmitting element in the direction perpendicular to the direction of polarization is selected to be substantially equal to that of said receiving piezoelectric elements in one of the direction of polarization and the direction perpendicular to the direction of polarization.

9. A tablet type coordinate input apparatus as claimed in claim 5, wherein said receiving piezoelectric elements are fixed at their surface perpendicular to the direction of polarization to the side surfaces of said planar medium means, while said transmitting piezoelectric element is fixed at its surface perpendicular to the direction of polarization to said planar surface of said waveguide rod, and the resonance frequency of said transmitting element in the direction perpendicular to the direction of polarization is selected to be substantially equal to that of said receiving piezoelectric elements in one of the direction of polarization and the direction perpendicular to the direction of polarization.

10. A tablet type coordinate input apparatus as claimed in claim 4, wherein said receiving piezoelectric elements are fixed at their surface perpendicular to the direction of polarization to the front surface of said flat medium means, while said transmitting piezoelectric element is fixed at its surface perpendicular to the direction of polarization to said planar surface of said waveguide rod, and the resonance frequency of said transmitting piezoelectric element in the direction perpendicular to the direction of polarization is selected to be equal to that of said receiving piezoelectric elements in the direction perpendicular to the direction of polarization.

11. A tablet type coordinate input apparatus as claimed in claim 5, wherein said receiving piezoelectric elements are fixed at their surface perpendicular to the direction of polarization to the front surface of said flat medium means, while said transmitting piezoelectric element is fixed at its surface perpendicular to the direction of polarization to said planar surface of said waveguide rod, and the resonance frequency of said transmitting piezoelectric element in the direction perpendicular to the direction of polarization is selected to be equal to that of said receiving piezoelectric elements in the direction perpendicular to the direction of polarization.

12. A tablet type coordinate input apparatus as claimed in claim 4, wherein said transmitting piezoelectric element and said receiving piezoelectric elements have different resonance frequencies in the direction of polarization and the direction perpendicular to the direction of polarization respectively.

13. A tablet type coordinate input apparatus as claimed in claim 5, wherein said transmitting piezoelectric element and said receiving piezoelectric elements have different resonance frequencies in the direction of polarization and the direction perpendicular to the direction of polarization respectively.

14. A tablet type coordinate input apparatus as claimed in claim 8, wherein said transmitting piezoelectric element and said receiving piezoelectric elements have different resonance frequencies in the direction of polarization and the direction perpendicular to the direction of polarization respectively.

15. A tablet type coordinate input apparatus as claimed in claim 9, wherein said transmitting piezoelectric element and said receiving piezoelectric elements have different resonance frequencies in the direction of polarization and the direction perpendicular to the direction of polarization respectively.

16. A tablet type coordinate input apparatus as claimed in claim 10, wherein said transmitting piezoelectric element and said receiving piezoelectric elements have different resonance frequencies in the direction of polarization and the direction perpendicular to the direction of polarization respectively.

17. A tablet type coordinate input apparatus as claimed in claim 11, wherein said transmitting piezoelectric element and said receiving piezoelectric elements have different resonance frequencies in the direction of polarization and the direction perpendicular to the direction of polarization respectively.

18. A tablet type coordinate input apparatus comprising input means having a built-in ultrasonic wave transmitting element generating an ultrasonic wave by being excited by an electrical signal and having a sharp-pointed end for radiating the ultrasonic wave, writable means for propagating the ultrasonic wave radiated from said input means, detecting means inlcuding wave receiving elements disposed at or adjacent to the corners of said writable means for converting the propagating ultrasonic wave into electrical signals, and signal processing means for identifying the position of said input means by processing the output signals of said detecting means, said writable means being composed of at least two laminar media including a laminar propagation medium propagating the ultrasonic wave and an overlying laminar input medium having a longitudinal wave propagation velocity lower than that of said laminar propagation medium, said wave receiving elements being mounted to said laminar propagation medium.

19. A tablet type coordinate input apparatus as claimed in claim 18, wherein an intermediate laminar medium is interposed between said laminar propagation medium and said laminar input medium constituting said writable means and has a longitudinal wave propagation velocity intermediate between that of said laminar propagation medium and that of said laminar input medium.

20. A tablet type coordinate input apparatus comprising input means having a built-in ultrasonic wave transmitting element generating an ultrasonic wave by being excited by an electrical signal and having a sharp-pointed end for radiating the ultrasonic wave, writable means for propagating the ultrasonic wave radiated from said input means, detecting means including wave receiving elements disposed at or adjacent to the corners of said writable means for converting the propagating ultrasonic wave into electrical signals, signal processing means for identifying the position of said input means by processing the output signals of said detecting means, and display means for displaying the identified position, said input means being provided at its sharp-pointed end with a contact-purpose small piece formed of a medium whose longitudinal wave propagation velocity is lower than that of said writable means.

* * * * *